Sept. 27, 1927.
F. W. MARTIN
1,643,308
LOCOMOTIVE BOOSTER APPARATUS
Filed June 18, 1925
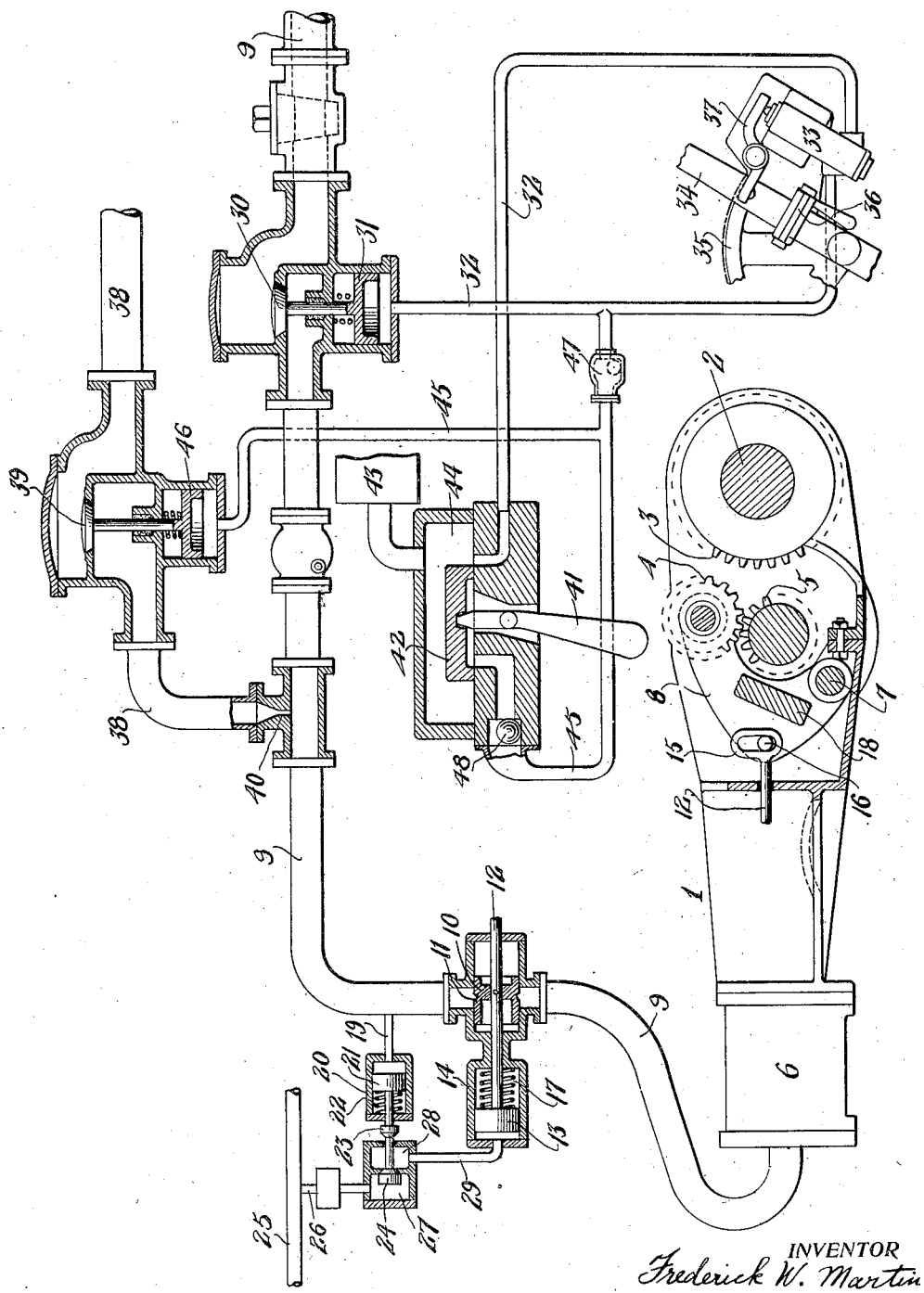
INVENTOR
Frederick W. Martin
BY
Synnestvedt & Lechner
ATTORNEYS Patented Sept. 27, 1927.

1,643,308

UNITED STATES PATENT OFFICE.

FREDERICK W. MARTIN, OF BRONXVILLE, NEW YORK, ASSIGNOR TO FRANKLIN RAILWAY SUPPLY COMPANY, A CORPORATION OF DELAWARE.

LOCOMOTIVE BOOSTER APPARATUS.

Application filed June 18, 1925. Serial No. 37,891.

This invention relates to locomotive booster apparatus more particularly to certain specific improvements in the controlling apparatus for such a motor.

Booster motors, as is now well understood in this art, are arranged to drive weight supporting wheels which would otherwise be idle in so far as propelling the locomotive is concerned. These wheels may be on an axle located either on the locomotive or on the tender. Entraining mechanism is provided so that the booster can be connected to the axle when it is desired to use it and disconnected from the axle when its period of operation comes to an end.

With the foregoing in mind the objects of my invention will be better understood. They include the provision of an entraining mechanism which, although useful wherever a booster is to be entrained, is particularly advantageous for use where boosters are to be applied to an axle and wheels on the tender; the provision of an air actuated entraining mechanism which is subject to the control of the pressure of the operating steam on its way to the booster; the provision of a controlling mechanism for a tender booster which will eliminate certain piping connections between locomotive and tender and at the same time avoid any troubles which sometimes have arisen in connection with condensation of steam where the booster is located on the tender at a considerable distance from the supply of steam on a locomotive; and finally the provision of an entraining mechanism which is operated by air pressure from the brake pipe of the train.

The foregoing together with such other objects as may appear hereinafter or are incident to my invention I obtain by means of a construction which is illustrated in preferred form in the accompanying drawing, wherein the single figure is a diagram of a booster apparatus involving or embodying my improvements. It will be understood, of course, that the parts illustrated on this diagram are not arranged in their actual relation to each other but in a functional relation.

The booster motor 1 is arranged to drive the axle 2 thru the medium of the gear 3 fixed to the axle, the movable idler gear 4 and the driving pinion 5 which latter is rotated by the pistons (not illustrated) in the booster cylinders 6. The idler gear 4 is mounted for movement upon the pivot 7 which is the pivotal point of support for what is known in the art as the entraining rocker 8. The gear 4 is always in mesh with the pinion 5 and by throwing the rocker 8 to the right on the pivot 7 it is possible to mesh the idler gear 4 with the gear 3 fixed to the axle 2.

Steam is supplied to the booster cylinders thru the conduit 9 in which is located a piston valve 10 and in the position indicated in the diagram this valve 10 blocks off or prevents the flow of steam for operating the booster. There is a comparatively small capacity by-pass preferably in the shape of the groove 11 around this valve 10 for the purpose of idling the booster motor prior to or during entrainment of the gears.

The valve 10 is fixed to the rod 12 of a piston 13 in the cylinder 14. In the figure the rod 12 is shown as broken for convenience in illustration but it is actually connected to the rocking member 8 by means of the eye 15 which embraces the pin 16 on the rocking member.

The piston 13 is shown in its retracted position with the idler gear 4 out of mesh as already described but upon introduction of pressure to the face of the piston 13 it will swing the rocker to the right and entrain the gears and at the same time move the valve 10 to uncover the conduit 9 and permit full flow of operating steam pressure through such conduit. The piston 13 operates against the spring 17 and the rocker 8 is gravity loaded by virtue of the weight 18.

Normally, of course, the valve 10 is in the position illustrated in the figure so that operating steam cannot pass to the booster. At a point in the conduit 9 in advance of the valve 10, i. e., on the side from which the steam supply comes, a small pipe 19 is tapped into the conduit 9. This pipe connects with the cylinder 20 and when pressure exists in the conduit 9 it will force the piston 21 against the pressure of the spring 22 to the left and thereby seat valve 23 and unseat valve 24, the former closing the exhaust to the atmosphere. It will be seen that this operation immediately establishes communication between the brake pipe 25 and the face of the piston 13 thru the pipe 26, chamber 27, chamber 28 and pipe 29. The piston 13 will then be moved to entrain the gear 4 as described and move the valve 10 so as to permit flow of operating fluid thru the conduit 9.

The brake pipe 25 is, of course, the ordinary brake pipe now universally used in railroad practice and it will, therefore, be seen that I have provided a very convenient apparatus for causing entrainment of the booster without the necessity of any fluid pressure lines from the locomotive back to the tender when the booster is applied to a truck under the tender, the only pipe necessary being the steam supply pipe 9.

The steam supply pipe 9 is preferably connected to the valve chest of the locomotive so that it receives steam only after the locomotive throttle has been opened. In the pipe 9 is the booster throttle 30 which is opened by the piston 31 upon introduction of pressure thru the pipe 32. The pipe 32 is subject to the control of the reverse lever pilot valve 33 in the manner now well understood in this art so that brief mention only will be made in this application. When the reverse lever 34 is moved into the corner of the quadrant 35 and the booster latch 36 is properly manipulated to engage the pivoted member 37 air pressure will flow thru the conduit 32 and the reverse lever pilot valve 33 will be in open position. By cutting back the reverse lever 34 or manipulating the booster latch 36 the valve in the reverse lever pilot valve 33 can be closed to stop the flow of air through the pipe 32. The booster throttle 30 will then close.

A preliminary small quantity of steam is supplied to the booster through the pipe 38 which taps into the pipe 9, said pipe 38 being under the control of the preliminary throttle valve 39. The restricted opening 40 is of less capacity than the small by-pass 11 in the valve 10 so that when preliminary steam is admitted to the conduit 9 it cannot build up sufficiently to move the piston 21 to open the valve 24. In other words there is a small quantity or a relatively small quantity of steam flowing to slowly rotate or idle the booster motor and this idling is under the direction and control of the engineer thru the medium of the handle 41 and slide valve 42. In the position indicated the slide valve 42 permits the usual driving operation of the booster because pressure from the reservoir 43 flows into the valve chamber 44 and down into the pipe 32 as clearly illustrated. But by moving the handle 41 to the left the valve 42 will close communication with pipe 32 and open communication with the pipe 45. Air pressure can then reach the piston 46 to open the preliminary throttle valve 39 as described.

The check valve 47 permits use of the preliminary throttle at the same time as the main throttle is being operated but prevents operation of the main throttle when only the preliminary steam is desired. In other words under normal operation it is desired to have the preliminary steam idle the booster motor during entrainment thereof and this is accomplished by permitting air pressure from the pipe 32 to pass the check valve 47, enter pipe 45 and raise the piston 46 to open the preliminary throttle valve. But when it is desired to idle the booster motor the check valve 47 will prevent operation of the main booster throttle 30.

The check valve 48 will prevent flow of air thru the pipe 45 in the direction opposite to that during the time that idling operation is taking place.

The source of steam supply for the pipe 38 is different from that for the pipe 9 so that idling pressure of steam can be available at all times whether or not the locomotive throttle is open.

It should be noted that the handle 41 is preferably gravity loaded so that the valve 42 will be held in a position which establishes communication with the pipe 32.

I claim:—

1. The combination of a normally disentrained locomotive booster motor, a conduit for supplying said motor with operating steam, an air pressure actuated entraining mechanism for the motor, and a valve normally closing the steam supply conduit which valve is adapted to be opened directly by the motion of the entraining mechanism when the booster is entrained.

2. The combination of a normally disentrained locomotive booster motor, a conduit for supplying said motor with operating steam, a motor device for entraining the booster, and a valve normally closing said conduit, said valve being adapted to be opened directly by the motion of said motor device when the booster is entrained.

3. The combination of a normally disentrained locomotive booster motor, air pressure actuated entraining mechanism therefor, a conduit for supplying said mechanism with air pressure, a conduit for supplying the booster with steam, and a valve normally closing said air supply conduit but adapted to be opened by pressure of steam in the steam supply conduit.

4. The combination of a normally disentrained locomotive booster motor, air pressure actuated entraining mechanism therefor, a conduit for supplying said mechanism with air pressure, a conduit for supplying the booster with steam, said entraining mechanism being adapted to prevent flow of steam through said conduit to the booster until after entrainment is accomplished, and a valve normally closing said air supply conduit but adapted to be opened by pressure of steam in the steam supply conduit in advance of the point of control exercised by the entraining mechanism.

5. The combination with the brake pipe of a train, of a normally disentrained, steam operated, locomotive booster motor, means actuated by pressure from the brake pipe for entraining said motor and means actuated by the pressure of the steam going to the booster for controlling the flow of entraining pressure.

6. The combination with the brake pipe of a train, of a normally disentrained locomotive booster motor, means actuated by pressure from the brake pipe for entraining said motor, a conduit for supplying the booster with steam, and means subject to the pressure of steam in said conduit for controlling the flow of brake pipe pressure to the entraining means.

In testimony whereof, I have hereunto signed my name.

FREDERICK W. MARTIN.